United States Patent
Robertson et al.

(10) Patent No.: US 9,588,325 B2
(45) Date of Patent: Mar. 7, 2017

(54) OPTICAL IMAGING PROCESSING SYSTEM

(71) Applicants: Huawei Technologies Co., Ltd., Shenzhen (CN); Cambridge Enterprise Limited, Cambridge (GB)

(72) Inventors: Brian Robertson, Cambridge (GB); Kun Li, Cambridge (GB); Daping Chu, Cambridge (GB); Jun Yao, Shenzhen (CN)

(73) Assignees: Huawei Technologies Co., Ltd., Shenzhen (CN); Cambridge Enterprise Limited, Cambridge (GB)

( * ) Notice: Subject to any disclaimer, the term of this patent is extended or adjusted under 35 U.S.C. 154(b) by 0 days.

(21) Appl. No.: 14/880,880

(22) Filed: Oct. 12, 2015

(65) Prior Publication Data
US 2016/0103305 A1    Apr. 14, 2016

(30) Foreign Application Priority Data
Oct. 14, 2014 (CN) .......................... 2014 1 0542706

(51) Int. Cl.
*H04N 9/31* (2006.01)
*G02B 17/08* (2006.01)
(Continued)

(52) U.S. Cl.
CPC ........... *G02B 17/086* (2013.01); *G03B 21/56* (2013.01); *H04N 9/31* (2013.01); *G03B 17/54* (2013.01); *G03B 21/28* (2013.01); *G03B 2206/00* (2013.01)

(58) Field of Classification Search
CPC .... G03B 21/56; G03B 2206/00; G03B 17/54; G03B 21/28; G02B 17/086; H04N 9/31
See application file for complete search history.

(56) References Cited

U.S. PATENT DOCUMENTS 5,400,069 A * 3/1995 Braun .................... H04N 7/144
                                                        348/14.08
8,488,247 B2    7/2013 Cai et al.
(Continued)

FOREIGN PATENT DOCUMENTS

CN    101750868 A     6/2010
CN    202614974 U    12/2012
(Continued)

OTHER PUBLICATIONS

Izadi et al., "Going Beyond the Display: A Surface Technology with an Electronically Switchable Diffuser," User Interface Software and Technology '08, Monterey, California, pp. 269-278, Association for Computing Machinery, New York, New York (Oct. 19-22, 2008).
(Continued)

*Primary Examiner* — Brian Yenke
*Assistant Examiner* — Sean Haiem
(74) *Attorney, Agent, or Firm* — Leydig, Voit & Mayer, Ltd.

(57) ABSTRACT

The present invention provides an optical imaging processing system. The system includes a screen, an incident light source, and at least one optical transmission medium, where the optical transmission medium is disposed in an optical imaging path in which the incident light source is emergent and is projected to the screen; an light incident face of the optical transmission medium faces the incident light source, and an light exiting face of the optical transmission medium faces the screen, where at least one cavity is included between the light incident face and the light exiting face of the optical transmission medium, and a cross-section shape of the cavity is an isosceles trapezoid; and the cavity includes a light transmission area and a light blanking area used for object accommodation, and the optical imaging path bypasses the light blanking area and penetrates through
(Continued)

the optical transmission medium through the light transmission area.

12 Claims, 13 Drawing Sheets

(51) Int. Cl.
  *G03B 21/56* (2006.01)
  *G03B 21/28* (2006.01)
  *G03B 17/54* (2006.01)

(56) References Cited

U.S. PATENT DOCUMENTS

| | | | |
|---|---|---|---|
| 2002/0163722 A1* | 11/2002 | Gehring | G03B 21/10 359/460 |
| 2003/0189821 A1* | 10/2003 | Moon | G02B 6/0021 362/609 |
| 2010/0110559 A1* | 5/2010 | Cai | F41H 3/00 359/642 |
| 2011/0249330 A1 | 10/2011 | Anderson et al. | |
| 2014/0192087 A1 | 7/2014 | Frost | |
| 2015/0248013 A1* | 9/2015 | Chen | H01Q 15/08 359/625 |

FOREIGN PATENT DOCUMENTS

| | | |
|---|---|---|
| JP | S6020692 A | 8/1985 |
| JP | H10339814 A | 12/1998 |
| JP | 2004057708 A | 8/2004 |

OTHER PUBLICATIONS

Coates et al., "Electrically induced scattering textures in smectic a phases and their electrical reversal," Journal of Physics D: Applied Physics, vol. 11, pp. 2025-2035, Institute of Physics, Bristol, England (Aug. 21, 1978).

Spruce et al., "Polymer dispersed liquid crystal (PDLC) films," Electronics & Communication Engineering Journal, vol. 4, Issue 2, pp. 91-100, Institute of Electrical and Electronics Engineers, New York, New York (Apr. 1992).

Pendry et al., "Controlling Electromagnetic Fields," Science, vol. 312, pp. 1780-1782, American Association for the Advancement of Science, Washington, DC (Jun. 23, 2006).

Leonhardt, "Optical Conformal Mapping," Science, vol. 312, pp. 1777-1780, American Association for the Advancement of Science, Washington, DC (Jun. 23, 2006).

Schurig et al., "Metamaterial Electromagnetic Cloak at Microwave Frequencies," Sciencexpress, American Association for the Advancement of Science, Washington, DC (Oct. 19, 2006).

Howell et al., "Simple, broadband, optical spatial cloaking of very large objects," (Jun. 10, 2013).

Zhang et al., "Macroscopic Invisibility Cloak for Visible Light," (Jan. 23, 2011).

Luo et al., "Phase-preserved optical elevator," Opt Express, vol. 21, Issue 6, The Optical Society, Washington, DC (Mar. 11, 2013).

Chen et al., "Ray-optics cloaking devices for large objects in incoherent natural light," Nature Communications, Macmillan Publishers, London, England (Oct. 24, 2013).

Willis et al., "Printed Optics: 3D Printing of Embedded Optical Elements for Interactive Devices," User Interface Software and Technology '12, Cambridge, Massachusetts, Association for Computing Machinery, New York, New York (Oct. 7-10, 2012).

Zoberbier et al., "Wafer-Level Cameras: Update on Fabrication and Packaging Technologies," 3D Packaging, Issue 13, SUSS MicroTec, Garching, Germany (Dec. 2009).

Office Action in corresponding Chinese Patent Application No. 201410542706.0 (Dec. 30, 2016).

\* cited by examiner

OPTICAL IMAGING PROCESSING SYSTEM

CROSS REFERENCE

The present invention claims the priority of Chinese Patent Application No. 201410542706.0, filed on Oct. 14, 2014, which is hereby incorporated by reference in its entirety.

TECHNICAL FIELD

Embodiments of the present invention relate to the field of optical technologies, and in particular, to an optical imaging processing system.

BACKGROUND

With the development of projection technologies, increasingly more short-focus projection products with a low cost and high brightness appear in the market. A seamless large-size display system may be constructed by using an array formed by multiple such short-focus projection products. With the popularization of projection, the cost of a similar large-size display system is constantly reduced, so that the large-size display system is possible to be used for conferencing or home entertainment. In an actual application process, if a display screen is large, cooperation of a support structural member is required when the screen is installed. In addition, proper deployment of a webcam further needs to be considered when such a screen is used for video communication. These issues become technical difficulties when the size of a screen becomes large.

However, in the prior art, a support structural member is made of a non-transparent material in most cases, and currently, there is no effective solution for the issue how the support structural member is installed on a surface of a screen under the precondition of not affecting the projection effect. In addition, a method of integrating an acquiring system to a display screen is mainly installing a webcam and an acquiring lens at the center of the screen. The webcam can shoot a scene before the screen by opening a hole on the screen or manufacturing the screen by using an electrically switchable scattering material. For example, a polymer dispersed liquid crystal (PLDC) is used on a screen of a rear projection system, and the screen can be transparent in a period of time by using a feature of the liquid crystal, so that images can be acquired.

However, the greatest defect of manufacturing the screen by using the electrically switchable material is that a camera can acquire an image only at the moment when the screen is transparent; therefore, the camera is required to have higher sensitivity. In addition, a shutter of the camera must have a very short starting and/or closing time to avoid a flicker effect, and at the same time, a complex synchronization system must be further provided, to ensure synchronization between the camera and the screen.

Therefore, in the prior art, a problem exists that it is difficult to implement the method of integrating a non-transparent object such as an acquiring system or a support structural member to a display screen.

SUMMARY

Embodiments of the present invention provide an optical imaging processing system, which is used to solve a problem that it is difficult to implement a method of integrating a non-transparent object to a display screen in an existing projection system.

According to a first aspect, an optical imaging processing system is provided, including:

an incident light source, a screen, and at least one optical transmission medium, where the optical transmission medium is disposed in an optical imaging path in which the incident light source is emergent and is projected to the screen;

an light incident face of the optical transmission medium faces the incident light source, and an light exiting face of the optical transmission medium faces the screen, where at least one cavity is included between the light incident face and the light exiting face of the optical transmission medium, and a cross-section shape of the cavity is an isosceles trapezoid or is a hexagon formed by two isosceles trapezoids; and the cavity includes a light transmission area and a light blanking area used for object accommodation, and the optical imaging path bypasses the light blanking area and penetrates through the optical transmission medium through the light transmission area.

In a first possible implementation manner of the first aspect, the cavity includes:

a first face used for incident light emitted by the incident light source to be incident;

a second face used for the incident light to reflect; and a third face used for the incident light to be emergent, where the first face and the third face respectively form two waists of the isosceles trapezoid; and if an incident point of the incident light on the first face is a midpoint of one side waist of the isosceles trapezoid, an emergent point of the incident light on the third face is a midpoint of the other side waist of the isosceles trapezoid.

With reference to the first possible implementation manner of the first aspect, in a second possible implementation manner of the first aspect, a coating film used for increasing a reflection coefficient is attached to the second face.

With reference to the first possible implementation manner of the first aspect, in a third possible implementation manner of the first aspect, an incident angle of the incident light on the first face is less than an angle of total reflection, and the first face is inclined.

In a fourth possible implementation manner of the first aspect, a cross-section shape of the light blanking area is an isosceles triangle or is a quadrangle formed by two isosceles triangles.

With reference to the fourth possible implementation manner of the first aspect, in a fifth possible implementation manner of the first aspect, the object accommodated in the light blanking area in the cavity in the optical transmission medium includes at least one of a support rod of the screen and an image acquiring device.

With reference to the first aspect, the first, the second, the third, the fourth, or the fifth possible implementation manner of the first aspect, in a sixth possible implementation manner of the first aspect, the screen includes a rear projection screen, and the incident light source includes a projector.

The embodiments of the present invention provide an optical imaging processing system. The system includes a screen, an incident light source, and at least one optical transmission medium, where the optical transmission medium is disposed in an optical imaging path in which the incident light source is emergent and is projected to the screen; an light incident face of the optical transmission medium faces the incident light source, and an light exiting face of the optical transmission medium faces the screen, where at least one cavity is included between the light incident face and the light exiting face of the optical transmission medium, and a cross-section shape of the cavity is an isosceles trapezoid or is a hexagon formed by two isosceles trapezoids; and the cavity includes a light transmission area and a light blanking area used for object accommodation, and the optical imaging path bypasses the light blanking area and penetrates through the optical transmission medium through the light transmission area, so that when a non-transparent object is placed in the light blanking area, the object does not obstruct light transmission to cast a shadow, and a problem that it is difficult to implement a method of integrating a non-transparent object to a screen in an existing projection system can be solved.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
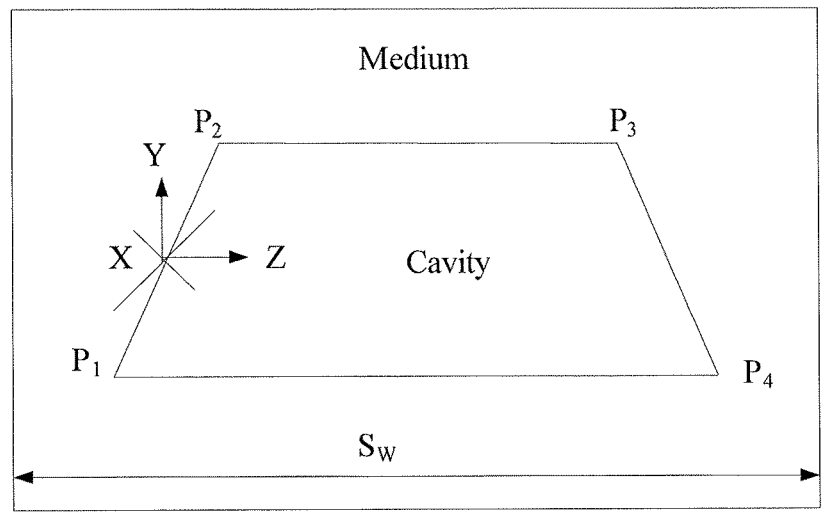
FIG. 1 is a schematic diagram of an interface of an optical transmission medium.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some rather than all of the embodiments of the present invention. All other embodiments obtained by persons of ordinary skill in the art based on the embodiments of the present invention without creative efforts shall fall within the protection scope of the present invention.

In order to solve a problem that it is difficult to implement a method of integrating an acquiring system to a display screen in an existing projection system, in the embodiments of the present invention, in an optical imaging processing system, a non-transparent object can be integrated to a front or rear projection screen in an existing projection system by using an optical blanking technology, or be integrated to an optical path for projection, which does not make the object cast a shadow either; in addition, the optical imaging processing system provided by the embodiments of the present invention does not need a complex control circuit, has a simple structure, is easy to be manufactured, has a compact structure, is easy to be integrated to an optical screen, and is easy to be reliably and firmly installed.

Embodiments of the present invention provide an optical imaging processing system, including: an incident light source, a screen, and at least one optical transmission medium, where the optical transmission medium is disposed in an optical imaging path in which the incident light source is emergent and is projected to the screen;

an light incident face of the optical transmission medium faces the incident light source, and the incident light is incident in a manner of being perpendicular to the light incident face of the optical transmission medium; and an light exiting face of the optical transmission medium abuts on the screen, or the optical transmission medium is located in the optical imaging path of the system; and the light incident face of the optical transmission medium faces the incident light source, and the light exiting face of the optical transmission medium faces the screen, where at least one cavity is included between the light incident face and the light exiting face of the optical transmission medium, and a cross-section shape of the cavity is an isosceles trapezoid or is a hexagon formed by two isosceles trapezoids; and the cavity includes a light transmission area and a light blanking area used for object accommodation, and the optical imaging path bypasses the light blanking area and penetrates through the optical transmission medium through the light transmission area.

Specifically, a cross-section shape of the light blanking area is an isosceles triangle or is a quadrangle formed by two isosceles triangles.

It should be noted that, for the convenience of description, the cavity mentioned above is denoted as a Dove cavity.

For example, the screen includes a rear projection screen, and the incident light source includes a projector. An object placed in the light blanking area in the cavity in the optical transmission medium includes, but is not limited to, a support rod of the rear projection screen and/or a camera.

For example, an acquiring aperture corresponding to an acquiring view angle of the camera is provided at a front end of the rear projection screen. An optical rod is disposed between the camera and the front end of the rear projection screen, and is used for reducing, on the basis of retaining the acquiring view angle of the camera unchanged, a size of the acquiring aperture provided at the front end of the rear projection screen.

By using the optical transmission medium included in the optical imaging processing system provided by the embodiments of the present invention, it is easy to place an acquiring system (for example, a camera or a webcam) in the light blanking area formed in the cavity in the optical transmission medium, and a shadow of the acquiring system is not cast; therefore, a problem that it is difficult to implement a method of integrating an acquiring system to a display screen in an existing projection system can be solved.

Based on the foregoing optical imaging processing system, incident light that penetrates through the cavity is rolled over upside down; therefore, an incident image in the optical imaging path is also rolled over upside down; and the embodiments of the present invention further provide a projector, including: a processor and an emitter.

The processor is used for determining a target area and a roll-over shaft of an image, where the target area is an area, in the image, in which the incident light transmitted through the cavity is projected, and the roll-over shaft is a straight line, in the target area, for projection of the incident light transmitted by using a midpoint of a waist of the isosceles trapezoid; and performing roll-over processing on the target area along the roll-over shaft, to obtain an incident image after the roll-over processing.

The emitter is used for emitting incident light, so as to project, by using the incident light, the image after the roll-over processing.

Because light refraction causes image roll-over, roll-over is performed on the target area in advance along the roll-over shaft by using the projector in the embodiments of the present invention, so that an emergent image is consistent with the incident image after the light passes through the optical transmission medium.

Specific implementation manners of the system in the embodiments of the present invention are described in detail below with reference to the accompanying drawings.

In the embodiments of the present invention, an example in which a camera and a support member are integrated to the rear projection screen is used. This solution may be further used in cooperation with another display technology such as an orthographic-projection screen and a planar display device.

The optical transmission medium in the embodiments of the present invention uses the foregoing optimally designed cavity, that is, the Dove cavity. FIG. 1 is a schematic diagram of an interface of an optical transmission medium. As shown in FIG. 1, the medium includes a cavity filled with air, where a refraction coefficient of air is $n_A$. A cross section of the cavity is a trapezoid, and is located in the medium with a refraction coefficient of $n_S$ and a width of Sw. The cavity is extended along a Z direction of the medium, and a cross section of the trapezoid is determined by coordinate points P1, P2, P3, and P4. The cavity includes a first inclined face formed by P1 and P2, a top face formed by P2 and P3, a second inclined face formed by P3 and P4, and a bottom face formed by P1 and P4. If incident light is incident on the first inclined face, the first inclined face is denoted as a first face, the top face is denoted as a second face, and the second inclined face is denoted as a third face.

Figure 2:
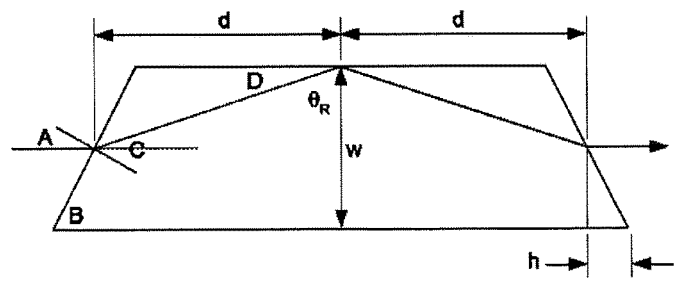
FIG. 2 is a schematic diagram of light transmission in a cavity.

FIG. 2 is a schematic diagram of light transmission in the cavity. As shown in FIG. 2, it is assumed that light perpendicular to an light incident face of the medium irradiates the cavity. An inclination angle between the first inclined face and the bottom face of the cavity is B; therefore, an included angle between the incident light and the first inclined face of the cavity is B, and an incident angle A of the incident light on the first inclined face of the cavity is equal to 90–B. It is assumed that the incident light is refracted to an angle C, and therefore:

$$C = \sin^{-1}\left(\frac{n_s \sin(A)}{n_A}\right),$$

where $n_S$ is a refractive index of the medium, and $n_A$ is a refractive index of air.

The incident light is incident to the top face of the cavity at an angle D, and D=C–A. The incident light is reflected to the second inclined face of the cavity, and then, is refracted again on the second inclined face to a direction perpendicular to alight exiting face of the medium. In an ideal condition, it is expected that, at a midpoint of the first inclined face, the incident light emits from the cavity at a position with a same height (y coordinate) as an incident point. This requires the cavity to be symmetric. It is assumed that, d is half a width of a center line of the cavity (from the midpoint to the first inclined face), h is a distance, in a y direction, from the midpoint of the first inclined face to a sharp corner at a lower portion of the first inclined face, and a relationship between d and the incident angle and a relationship between h and the incident angle are determined by the following equations:

$$d = \frac{w}{2\tan(D)} \text{ and } h = \frac{w}{2\tan(B)},$$

where w is a height of the cavity.

If $P_1$ is an original point, coordinates of 4 vertexes of the cavity may be obtained as follows:
1) $P_1$=(0, 0);
2) $P_2$=(2h, w);
3) $P_3$=(2d, w); and
4) $P_2$=(2d+2h, 0).

In FIG. 2, an inclination angle $\theta_R = \pi/2 - D$. This angle is an incident angle relative to a top reflective face. This angle determines a light transmission path in the cavity.

Figure 3:
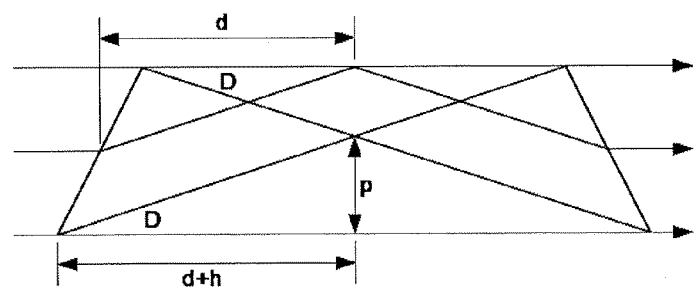
FIG. 3 is a schematic diagram of a light blanking area.

It can be obtained through simulation calculation by using optical software Zemax that, there is an area whose cross section is a triangle in the cavity, and no light passes through the area. Placing an object in the area does not affect light transmission; therefore, the area may become a light blanking area. FIG. 3 is a schematic diagram of the light blanking area. As shown in FIG. 3, a range of the light blanking area is an isosceles triangle with a height of p and a width of $2^l$, where $^l$=d+h. It can be obtained from FIG. 3 that p=(d+h) tan(D).

Therefore, a triangular light blanking area along a direction of the bottom face is obtained.

In the embodiments of the present invention, a longitudinally symmetric double Dove cavity may be further used in the optical transmission medium, that is, a cross-section shape of the cavity is a hexagon formed by two isosceles trapezoids shown in FIG. 2, so that the light blanking area has a rhombic structure, that is, a quadrangle formed by two isosceles triangles shown in FIG. 3, and a height of the light blanking area increases to 2p.

It should be noted that, when an angle between the first inclined face and the bottom face of the cavity is unchanged, as a refraction index of the medium increases, a refraction angle increases, a width of the light blanking area decreases, and the height of the light blanking area increases. As the refraction index of the medium decreases, the refraction angle decreases, the width of the light blanking area increases, and the height of the light blanking area decreases.

A relationship between the width $2^l$ of the light blanking area and the incident angle A and a relationship between the height p of the light blanking area and the incident angle A when the height w of the cavity varies are analyzed below.

Figure 4:
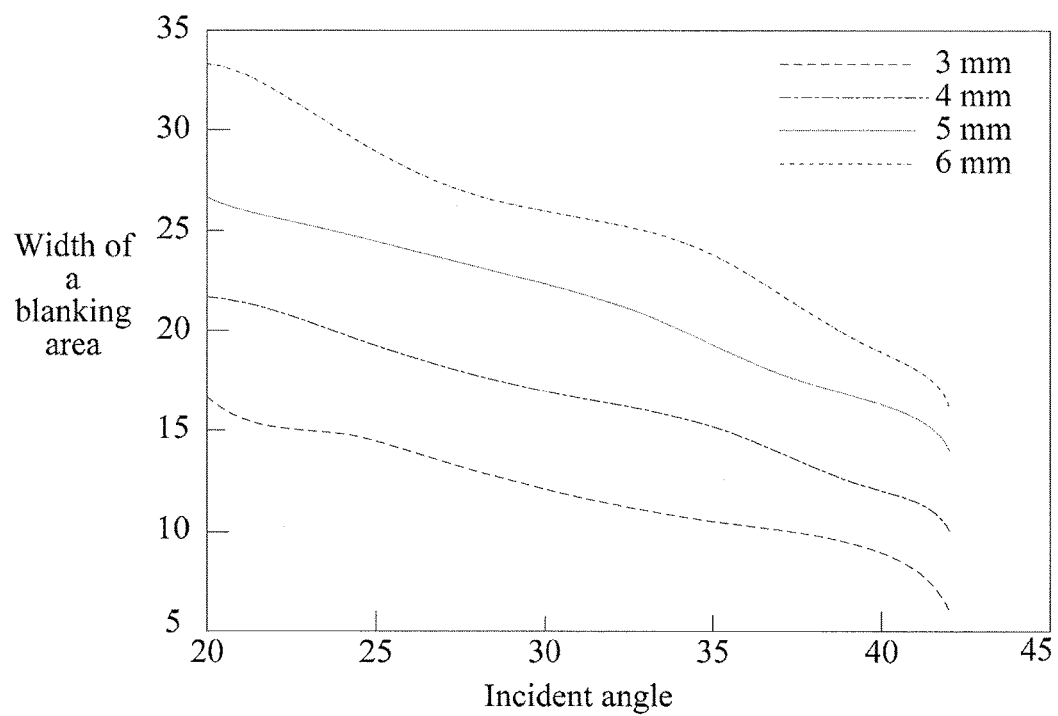
FIG. 4 shows a relationship between a width of the blanking area and an incident angle when a height of the cavity varies.

FIG. 4 shows the relationship between the width of the blanking area and the incident angle when the height of the cavity varies. FIG. 4 shows a relationship between the width $2^l$ of the blanking area and the incident angle A when the height of the cavity w is 3, 4, 5, or 6 millimeters. It is assumed that when the refraction index of the medium is 1.5, an upper limit (a critical angle) of the incident angle A is 41.8 degrees, and incident light greater than 41.8 degrees generates total reflection on the first face of the cavity. It can be seen that, as the height of the cavity increases, the width of the blanking area decreases as the incident angle A increases; and the width of the blanking area increases.

Figure 5:
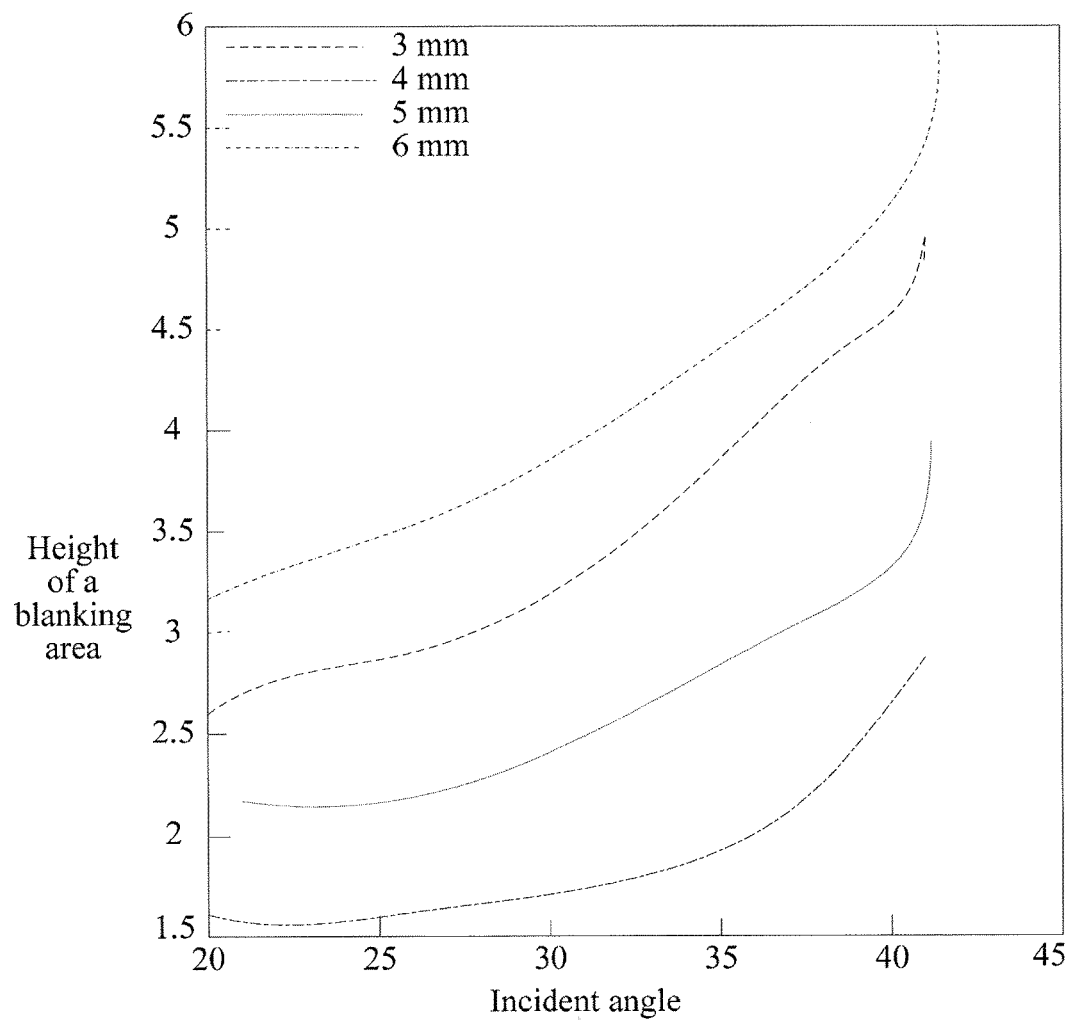
FIG. 5 shows a relationship between a height of the blanking area and the incident angle when the height of the cavity varies.

FIG. 5 shows the relationship between the height of the blanking area and the incident angle when the height of the cavity varies. FIG. 5 shows a relationship between the height of the blanking area and the incident angle when the height of the cavity is 3, 4, 5, or 6 millimeters. It can be seen that, the height of the blanking area increases as the incident angle increases, especially when the incident angle approaches the critical angle.

Figure 6:
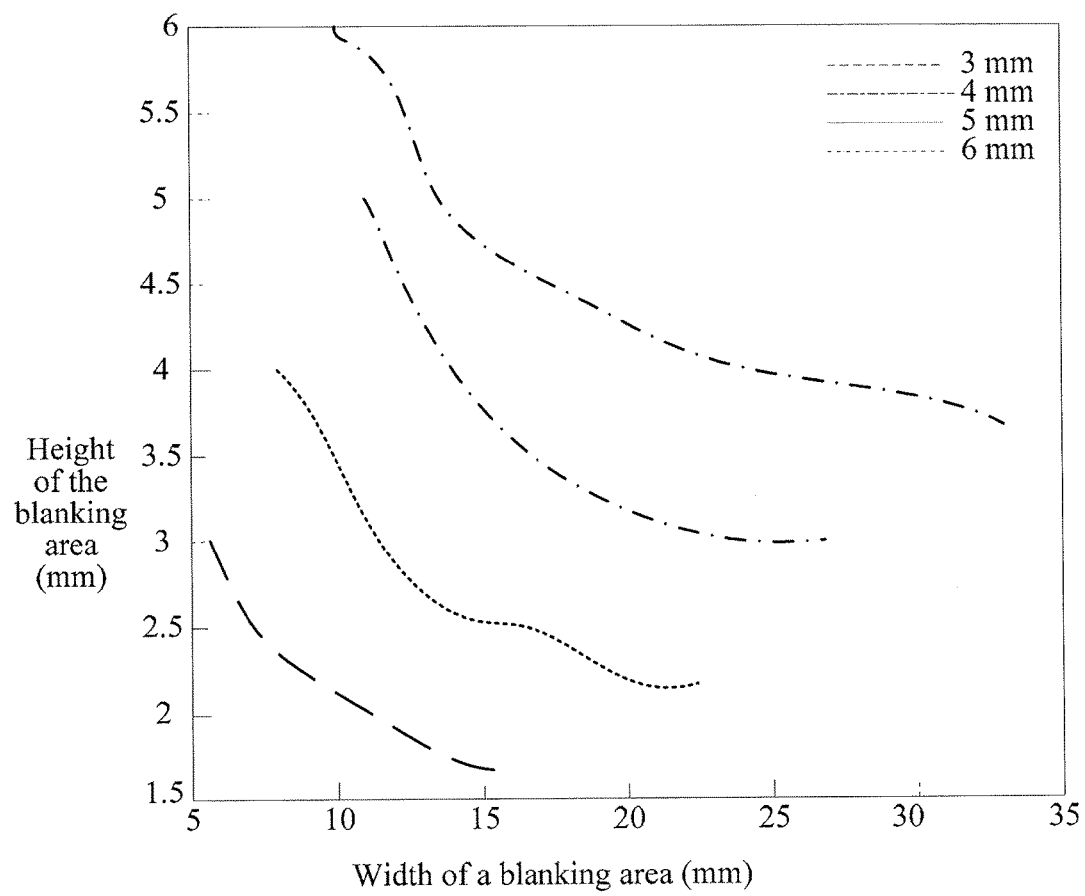
FIG. 6 shows a relationship between the height of the blanking area and the width of the blanking area when the height of the cavity varies.

FIG. 6 shows a relationship between the height of the blanking area and the width of the blanking area when the height of the cavity varies. As shown in FIG. 6, when the height of the cavity is 3, 4, 5, or 6 millimeters, the height of the blanking area is inversely proportional to the width of the blanking area.

It should be noted that, when being transmitted in the cavity, light needs to be refracted on the first and second inclined faces twice and reflected on the top face once. In a cavity formed by a pure dielectric, reflection losses can be observed on three faces. These losses may be obtained through calculation by using a standard Fresnel reflection/transmission coefficient for S-polarization and P-polarization.

Figure 7:
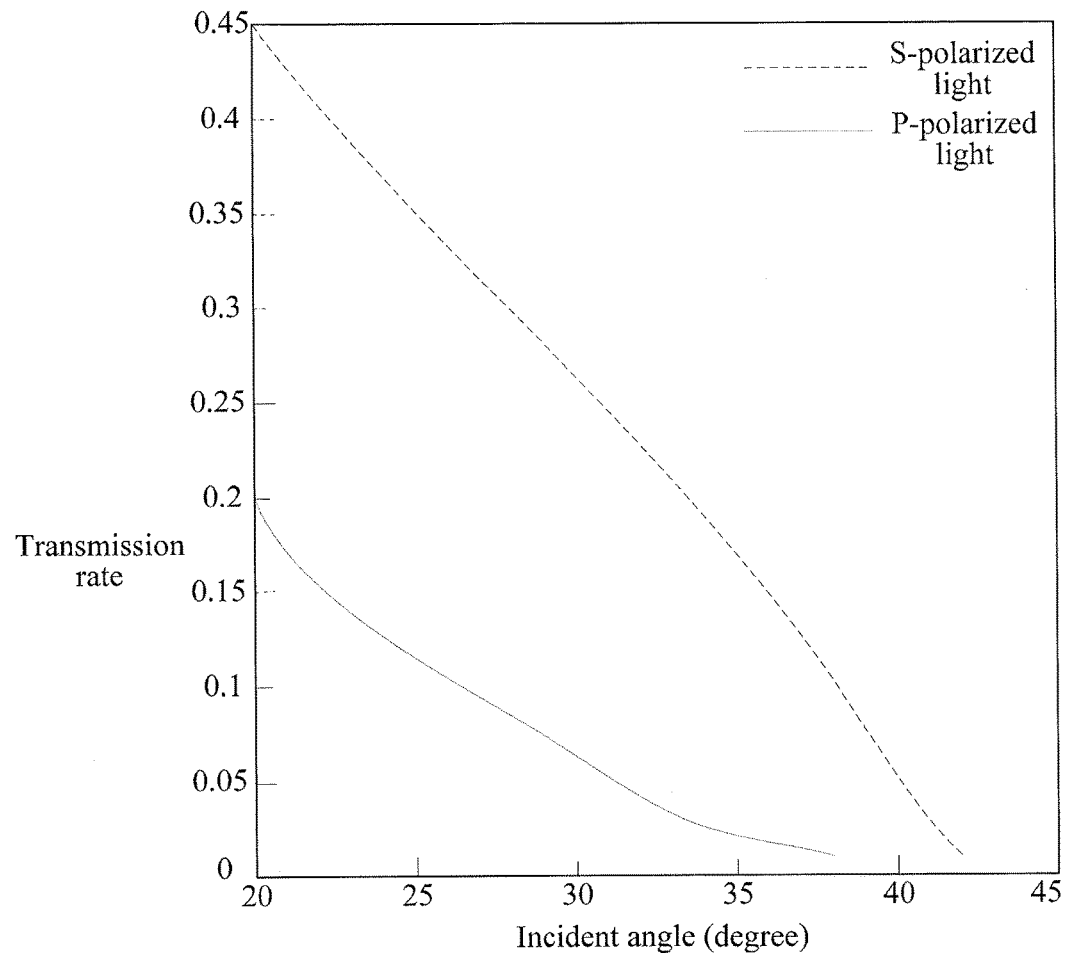
FIG. 7 is a schematic diagram of relationships between transmission rates of transmission of S-polarized and P-polarized light in a Dove cavity and the incident angle.

FIG. 7 is a schematic diagram of relationships between transmission rates of transmission of S-polarized and P-polarized light in a Dove cavity and the incident angle. As shown in FIG. 7, it is assumed that the refraction coefficient of the medium is 1.5. It can be seen that, for a minimum incident angle of 20 degrees, the transmission rates of the S-polarization and the P-polarization respectively are 0.45 and 0.2. The transmission rate decreases as the incident angle increases, and at the critical angle of 41.8 degrees of the incident angle, because total reflection is generated, the transmission rate becomes 0. The transmission rate is related to only the incident angle, and is unrelated to a width of the cavity.

At a small incident angle, the transmission rate mainly depends on a reflection loss on the top face. At a large incident angle, the transmission rate depends on Fresnel losses on the first and second inclined faces of the cavity. For the Dove cavity in the present invention, if the incident angle is A, a reflection angle on the top face is as follows:

$$\theta_R = \frac{\pi}{2} - \mathrm{asin}\left(\frac{n_S \sin(A)}{n_A}\right) - A,$$

where $n_S$ is the refractive index of the medium, and $n_A$ is a refractive index of the cavity.

In the present invention, when it is assumed that the refraction coefficient of the medium is 1.5, transmission rates at an incident angle of 20 degrees to an incident angle of 41.8 degrees are analyzed. 20 degrees is an incident angle at which a proper width of the blanking area can be obtained, and 41.8 degrees is a critical angle at which total reflection may be generated on the first inclined face of the cavity. A reflection angle, corresponding to the incident angle, on the top face of the cavity is 79.1 degrees to 41.8 degrees.

Figure 8:
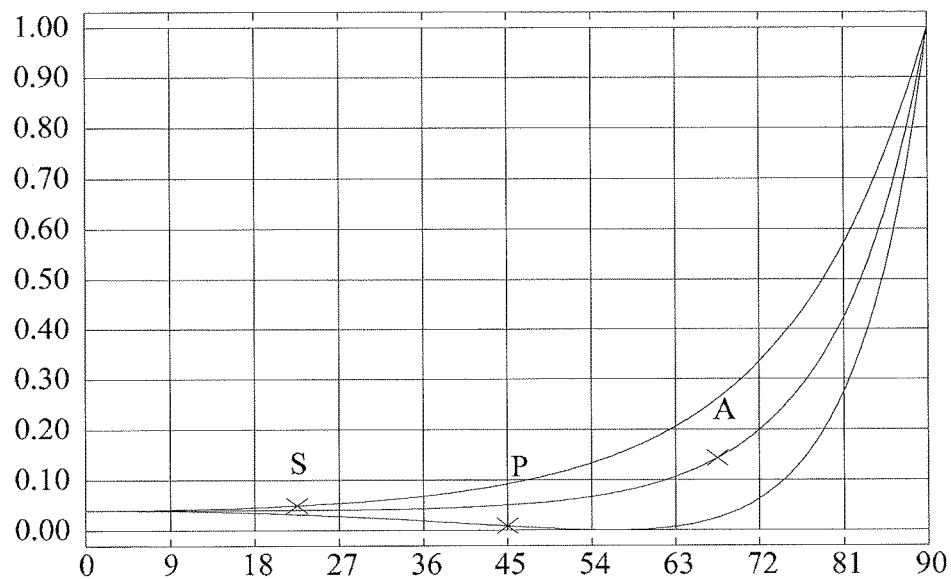
FIG. 8 is a schematic diagram of relationships between reflectivity of different polarized light and the incident angle.

In order to detect a reflection effect on a top portion, for S-polarized, P-polarized, and average polarized (non-polarized) incident light, relationships between reflectivity of the incident light on an air/medium surface and the incident angle may be analyzed. FIG. 8 is a schematic diagram of relationships between reflectivity of different polarized light and the incident angle. As shown in FIG. 8, it is assumed that the refraction coefficient $n_S$ of the medium is equal to 1.5, it should be noted that, in FIG. 8, an angle on an x plane is $\theta_R$. Reflectivity of the S-polarized light increases as the incident angle increases, until the reflectivity reaches 100% at an incident angle of 90 degrees. Reflectivity of the P-polarized light decreases, and when the incident angle is a Brewster angle, the reflectivity is 0 and then gradually increases, and when the incident angle reaches 90 degrees, the reflectivity increases until 100%.

A variation relationship between reflectivity, on the top portion, of different polarized light and the reflection angle is as follows:

1) for the P-polarized light, when the reflection angle $\theta_R$ is 41.8 degrees, reflectivity on the top portion is 1.2%; when the reflection angle $\theta_R$ is 79.1 degrees, the reflectivity on the top portion is 20.6%; and when the reflection angle $\theta_R$ is a Brewster angle, the reflectivity on the top portion is 0;

2) for the S-polarized light, when the reflection angle $\theta_R$ is 41.8 degrees, reflectivity on the top portion is 8.2%; and when the reflection angle $\theta_R$ is 79.1 degrees, the reflectivity on the top portion is 51%; and 3) for the non-polarized light, when the reflection angle $\theta_R$ is 41.8 degrees, reflectivity on the top portion is 4.7%; and when the reflection angle $\theta_R$ is 79.1 degrees, the reflectivity on the top portion is 35.8%.

In order to reduce a loss, reflectivity on the top face needs to be decreased. In this embodiment, an aluminum coating film may be added to the top face of the cavity; in this case, for non-polarized light at any incident angle, reflectivity thereof varies between 95% and 90%, and it is very obvious that the transmission rate is also greatly improved. It is assumed that the refraction coefficient $n_S$ of the medium is equal to 1.5, and it is obtained through a simulation experiment that a transmission loss of the S-polarized light is the minimum at a small incident angle, and that a loss of the P-polarized light is the minimum at an incident angle of 36.4 degrees (the transmission rate is 77.9%).

In the embodiments of the present invention, an aluminum reflective surface may be added to the top face of the Dove cavity by using a coating process or a method of installing a reflective aluminum tape. The transmission loss may also be reduced by using a method of limited projection and only emitting the S-polarized light. In an ideal condition, a method of combining a holographic projection technology with a metal reflective surface may be used. In this method, a loss in the Dove cavity can be overcome by redistributing light, and the least influence is brought to projection efficiency.

It is assumed that the foregoing optical transmission medium is applied to a rear projection system, if a large screen formed by splicing multiple rear projection screens, for example, a 2×2 screen or a larger screen, needs to be constructed, a method is to use a metal rod along the screen to provide a support structure to give support; however, the metal rod obstructs a part of an image; therefore, by using the optical transmission medium in the present invention, the light blanking area in the Dove cavity in the medium may be used to hide the metal rod.

Figure 9:
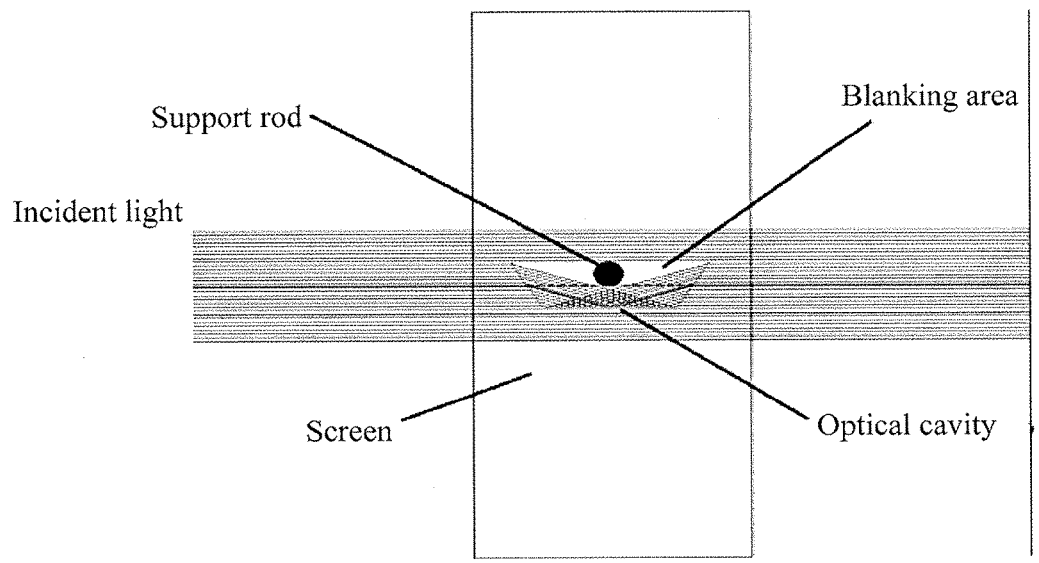
FIG. 9 is a planar image of a model of blanking of a screen support rod in a Dove cavity.
Figure 10:
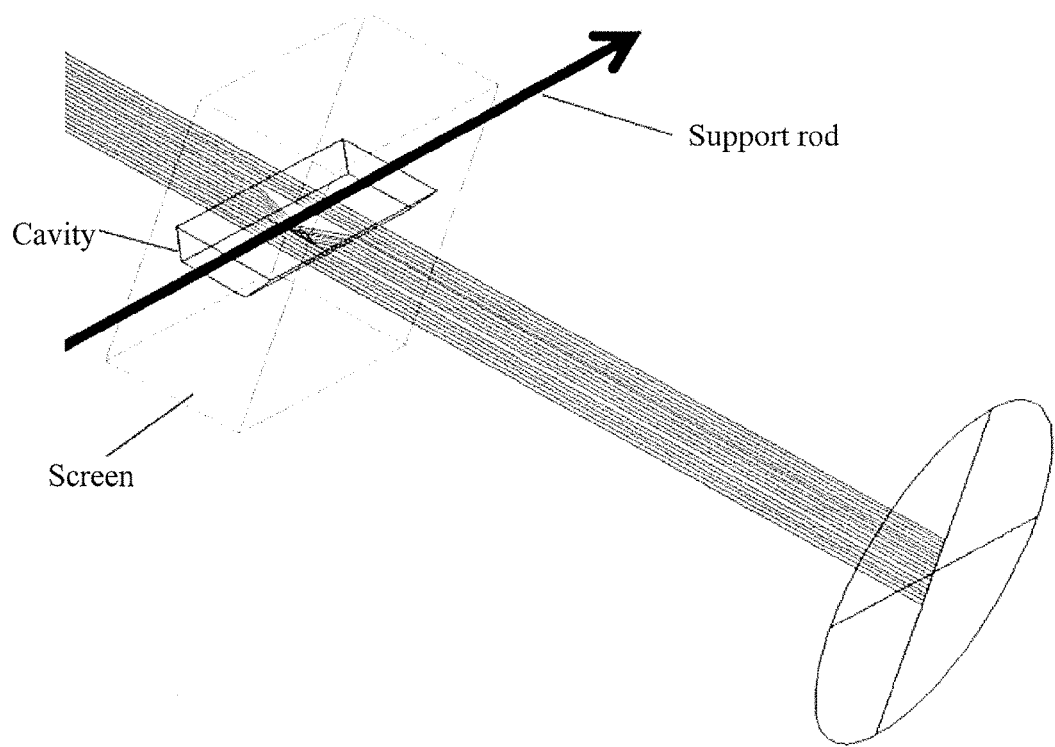
FIG. 10 is a three-dimensional diagram of a model of blanking of the support rod along a direction of a screen.

FIG. 9 is a planar image of a model of blanking of a screen support rod in the Dove cavity. FIG. 10 is a three-dimensional diagram of a model of blanking of the support rod along a direction of the screen. As shown in the figures:

for light incident from a left side, after the incident light is refracted and reflected, a blanking area through which no light passes is formed in an area in the cavity. A metal rod for support may be placed in this blanking area, and projected light is transmitted around the metal rod; therefore, at a right side of the screen, the metal rod is invisible. Because a diffusion layer of the screen is located at a right side of the medium, illuminating light from the right side of the screen is scattered at the diffusion layer, and therefore, the metal rod of the support structure cannot be viewed from an illuminating light source either.

In the foregoing design, light that penetrates through the cavity is rolled over upside down; therefore, a projection image obtained through is also rolled over upside down; and in the embodiments, a corresponding roll-over processing algorithm is used to calibrate roll-over of the projection image obtained through.

$X_{ij}$ used to indicate a pixel coordinate point of an incident image, where i indicates a quantity of rows (a pixel coordinate in the y direction), and j is a quantity of columns (a pixel coordinate in an x direction).

It is assumed that the cavity is placed along a horizontal direction, pixel position information on $X_{ij}$, on the first inclined face, of the incident image when the incident image passes through the cavity in the optical transmission medium is acquired, where i=m, ..., m+k, and j=n, ..., n+L; m and n indicate a start position of an image corresponding to the cavity, and k and the L indicate a quantity of rows and a quantity of columns of the image corresponding to the cavity.

Roll-over processing is performed on the pixel position information, to obtain an incident image $X'_{ij}$ after the roll-over processing, and $X'_{ij}=X_{i+k-s,j}$, where s=1, ..., k, and j=n, ..., n+L.

After the roll-over processing, pixel position information, on the second inclined face, of an incident image after the roll-over processing when the incident image passes through the cavity is acquired, that is, an emergent image corresponding to the incident image can be obtained.

For example, roll-over processing for the longitudinally symmetric double Dove cavity is as follows:

$X_{ij}$ indicates an incident image, where i indicates a quantity of rows and j is a quantity of columns; it is assumed that the cavity is placed along the horizontal direction, pixel position information, on the first inclined face, of the incident image when the incident image passes through the cavity in the optical transmission medium is $X_{ij}$, where i=m, ..., m+2k, and j=n, ..., n+2L; n indicates a start position of an image corresponding to the cavity; and 2k and 2L indicate a quantity of rows and a quantity of columns of the image corresponding to the cavity.

The pixel position information of the incident image after the roll-over processing is as follows:

$$X'_{i+k-s,j}=X_{i+s-1,j};$$

and $$X'_{i+k-s,j}=X_{i+2k-s,j},$$

where s=1, ..., k, and j=n, ..., n+L.

The roll-over processing algorithm may be implemented by using hardware or software in the projection system. For a multi-projection fusion system, the roll-over processing algorithm may also be implemented in projection fusion processing software. Because image processing software may cooperate with the roll-over processing algorithm, blanking processing in the present invention can be simplified.

In the foregoing simulation, it is assumed that the included angle between the incident light and the first inclined face of the cavity is 30 degrees. The refraction coefficient of the medium is 1.5, and the blanking area that can be obtained is a triangle, where a length of a bottom edge of the triangle (the width of the blanking area) is 14.2 millimeters, and a height is 2 millimeters. A size of the cavity can be linearly extended, if the width decreases to a half, the height decreases to 1 millimeter.

The support rod shown in the figure may be fastened on the cavity in an attaching manner. The attaching does not extend outside the blanking area.

In the following embodiments, an example in which a camera is installed and blanked by using a double Dove prism cavity is used for description, and key parameters of a camera module are as follows:

a size of a senor: ⅙ inch;

effective pixels: 1296×976 (1.26 million pixels);

a pixel size: 1.9 micrometers×1.9 micrometers;

a size of the module (length/width): 5.2 millimeters×4.4 millimeters;

a height of the module: 3.2 millimeters;

an aperture: 2.8;

a view angle: 63° (a diagonal line); and power consumption: 135 mW.

The camera module is connected to a motherboard by using a spherical array pin to provide a power supply, control a signal, and output an image. It is assumed that the motherboard is extended along a direction of a blanking cavity, a height is 4.4 millimeters, a length is 24 millimeters, and a thickness of the motherboard is less than 0.5 millimeter.

The camera module is integrated to a wafer camera, a contour is a taper, a base area is 5.2 millimeters×4 millimeters, a height of the taper is 3.2 millimeters, and an area of a top portion is 3.1 millimeters×3.1 millimeters. A tapered hole of 63 degrees is opened on the screen of the Dove cavity in the medium, so that the tapered hole has a same view angle as the camera without affecting acquiring.

It is assumed that a clear height of the cavity is 5 millimeters, and according to the symmetric feature of the double Dove cavity, p=2.5 millimeters. If it is assumed that projected emergent light is the P-polarized light, the refraction coefficient of the medium of the screen is 1.5. An optimal incident angle is 36.4 degrees. The P-polarized light is selected because the transmission rate thereof is the highest and the incident angle thereof is the largest, so that a more compact structure can be supported, where A=36.4°;
P=2.5 mm;
w=3.657 mm;
h=1.348 mm;
d=3.669 mm;
L=10.033 mm; and
coordinates of P1, P2, P3, and P4 respectively are as follows:
$P_1$=(0,0);
$P_2$=(2.696, 3.657);
$P_3$=(7.336, 3.657); and
$P_2$=(10.033, 0).

It is further assumed that thicknesses of mediums at the left and the right of the Dove cavity is 1 millimeter, so that the width of the entire medium is 12 millimeters. A system model is constructed by using the Zemax, and a parameter is adjusted, so that the camera module is exactly located in the blanking area in the cavity, and a diameter of an imaging hole exactly matches a view angle of 63 degrees at the same time.

Figure 11:
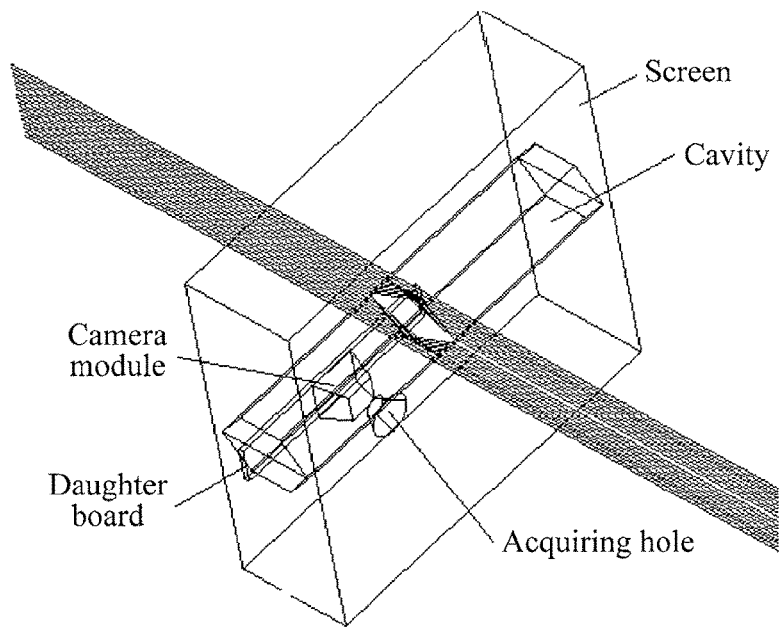
FIG. 11 is a schematic three-dimensional diagram of a Dove cavity model including a camera module, a circuit board, and an acquiring aperture.
Figure 12:
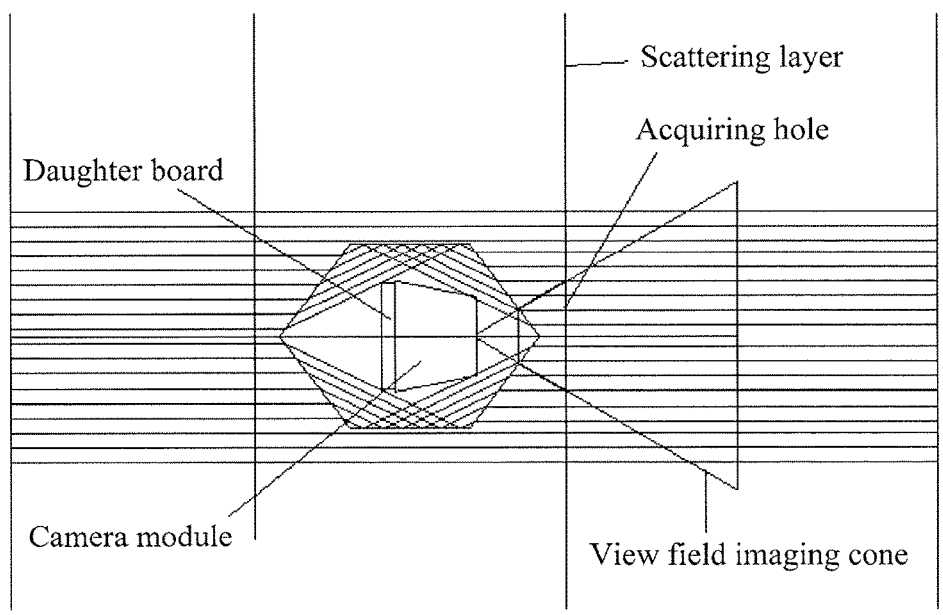
FIG. 12 is a schematic side view of the Dove cavity model including the camera module, the circuit board, and the acquiring aperture.

FIG. 11 is a schematic three-dimensional diagram of a Dove cavity model including a camera module, a circuit board, and an acquiring aperture. FIG. 12 is a schematic side view of the Dove cavity model including the camera module, the circuit board, and the acquiring aperture. As shown in FIG. 11, a double Dove cavity, the camera module, a daughter board, the acquiring aperture, and a screen scattering layer at a lower side of the acquiring aperture are included. A design of the acquiring aperture is allowing the camera module to work exactly at a view angle of 63 degrees. A tapered cavity becomes 2.2 millimeters from a maximum size of 4.4 millimeters. In the figure, that light distributed in an umbrella shape penetrates through the cavity in a y direction is drawn. It can be seen from FIG. 12 that, the light is not obstructed by the camera module or the daughter board. In order to enlarge a blanking area to accommodate a related component, a value of p needs to be increased to 3 millimeters; therefore, a width of a screen is also correspondingly increased to 12 millimeters.

Figure 13:
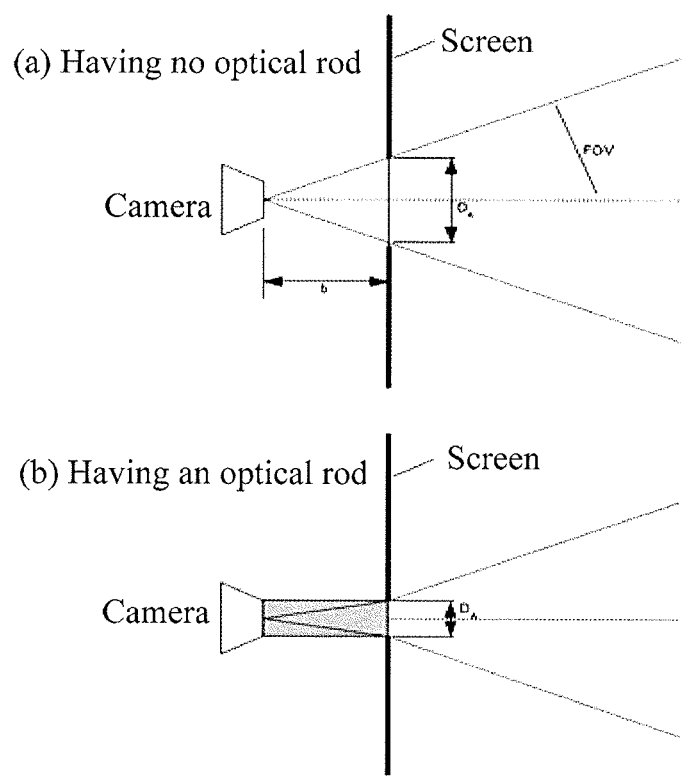
FIG. 13 is a schematic comparison diagram of reducing a size of the acquiring aperture by using an optical rod.

However, it can be seen from FIG. 12 that, scattering light in the y direction penetrates through the screen, and is not obstructed. However, because a maximum diameter of the acquiring aperture is 4.4 millimeters, an image within 4.4 millimeters is lost; therefore, in the embodiments of the present invention, an optical rod is used to extend an optical part of a camera to a surface of the screen. FIG. 13 is a schematic comparison diagram of reducing a size of the acquiring aperture by using the optical rod. As shown in FIG. 13, an imaging face of the camera may be placed in front, and the acquiring aperture can be decreased to 3 millimeters by using this solution.

Figure 14:
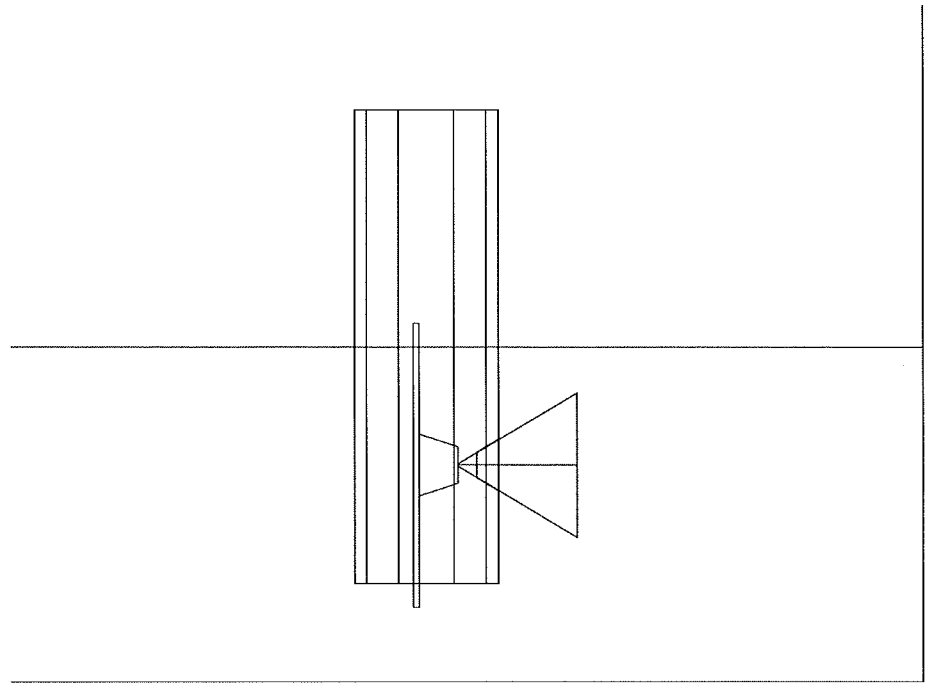
FIG. 14 is a schematic diagram of a top face of the Dove cavity model including the camera module, the circuit board, and the acquiring aperture.

FIG. 14 is a schematic diagram of a top face of the Dove cavity model including the camera module, the circuit board, and the acquiring aperture. As shown in FIG. 14, the daughter board may be extended to 24 millimeters; in this way, enough space can be provided for an electrical interface of the camera. A connecting cable (a power supply, a control line, and a signal cable) of the camera may be deployed along a direction of the cavity, and WIFI or an optical signal may also be used for data transmission and power supplying.

Figure 15:
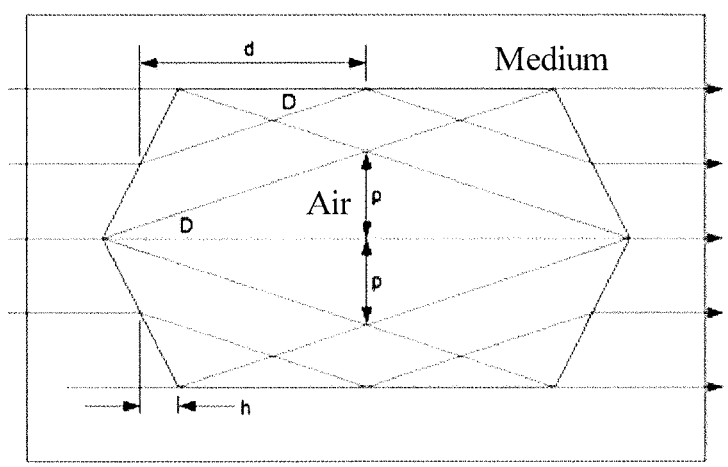
FIG. 15 is a schematic diagram of an interface of a double Dove cavity in a medium being organic glass.

In actual use, when the camera is installed in the double Dove cavity, a specific structure further needs to be designed, so that the installed camera does not affect light projection. The following describes a mechanical structure in which a camera is transparently installed and does not affect light transmission. FIG. 15 is a schematic diagram of an interface of a double Dove cavity in a medium being organic glass. As shown in FIG. 15, a blanking area is rhombic, a height is 2p, a width is 2(d+h); and if a component is installed by using a metal support, light is obstructed; therefore, a transparent optical structure may be used for support.

The support structure is made of a transparent material such as organic glass. In order to ensure that transmission of incident light is not deflected, if an incident point of incident light on the first inclined face is a midpoint of a side waist of the isosceles trapezoid forming the cross section of the cavity, an emergent point of the incident light on the second inclined face is a midpoint of the other side waist of the isosceles trapezoid. In addition, upper and lower surfaces of the support structure further need an aluminum coating film, to minimize a reflection loss. It is best to use an antireflection film for front and rear surfaces to minimize a transmission loss.

Figure 16:
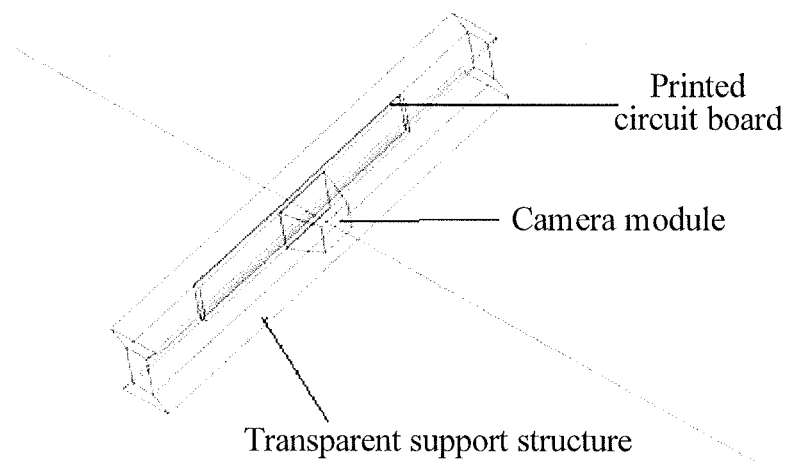
FIG. 16 is a schematic design diagram of a structure having the camera module and a corresponding circuit board installed.

FIG. 16 is a schematic three-dimensional diagram of a structure having the camera module and a corresponding circuit board installed. As shown in FIG. 16, the circuit board is directly installed on a support rack, and an open hole is provided on the support rack to accommodate the camera.

Figure 17:
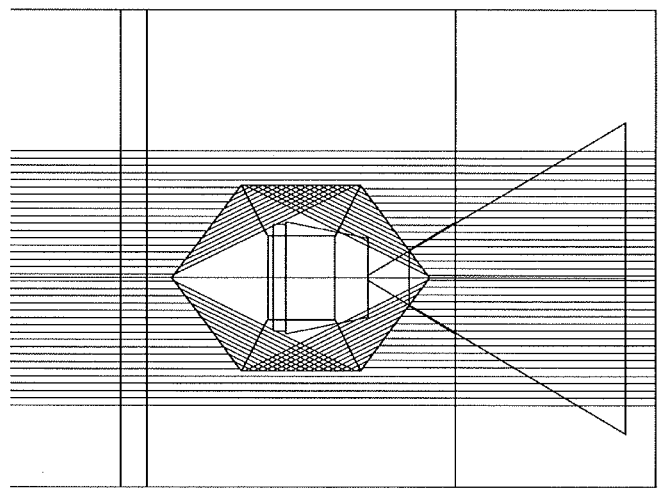
FIG. 17 is a side view of light transmission simulation of the structure having the camera module and the corresponding circuit board installed.

FIG. 17 is a side view of light transmission simulation of the structure having the camera module and the corresponding circuit board installed, where the simulation uses a model of the Zemax. It can be seen that, the light is not deformed when penetrating through the support rod. Therefore, the camera and the circuit board can be very reliably installed in the cavity without casting any shadow. It is assumed that the upper and lower surfaces use an aluminum coating layer in the simulation.

Figure 18:
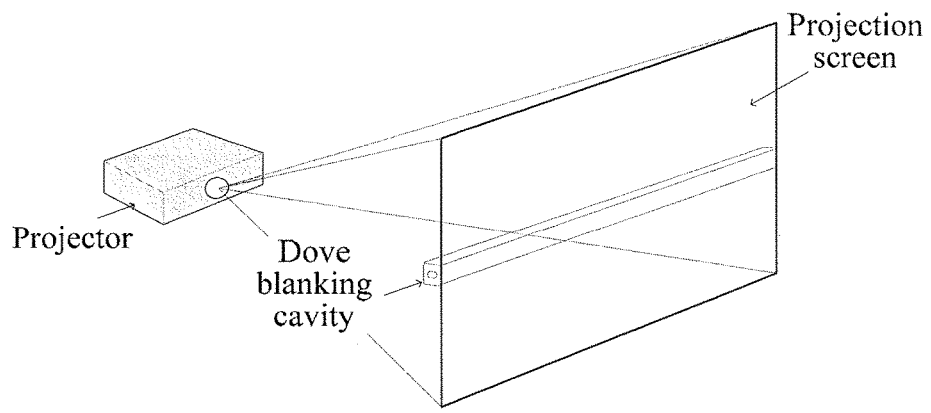
FIG. 18 is a schematic structural diagram of a projection system including a blanking optical module.

By using the foregoing solution, in the embodiments of the present invention, a projection system integrated with a hidden shooting device can be constructed. FIG. 18 is a schematic structural diagram of a projection system including a blanking optical module. As shown in FIG. 18, the projection system includes a projector, a rear projection screen, and an optical module (equivalent to the optical transmission medium described above) closely attached to a screen and located in an optical axis of the projector, where the optical module includes a Dove cavity. According to the foregoing design method, a blanking area in the Dove cavity can blank an object in the blanking area. Therefore, a support rack, an acquiring module, and the like may be installed in the blanking area.

Figure 19:
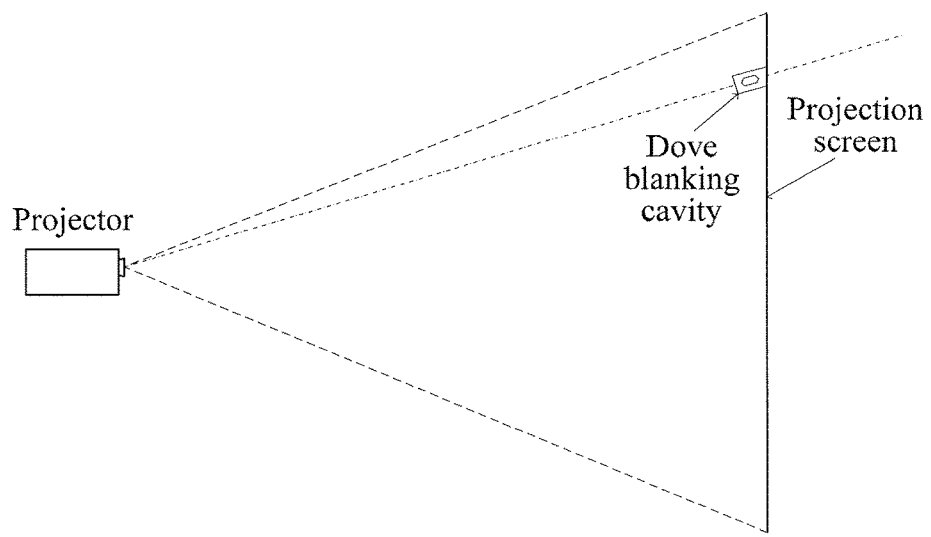
FIG. 19 is a schematic structural diagram of another projection system including a blanking optical module.

FIG. 19 is a schematic structural diagram of another projection system including a blanking optical module. In an actual system, an optical module (equivalent to the optical transmission medium described above) may need to be installed at a position on a non-optical axis. In this case, a shape of a Dove cavity needs to be adjusted according to a position at which the optical module is placed. According to the foregoing design, the adjustment needs to meet the following two conditions:

A: it needs to be ensured that a direction in which the optical module faces a projection screen remains perpendicular to incident light; and B: a central axis of the Dove cavity is parallel to the incident light.

Figure 20:
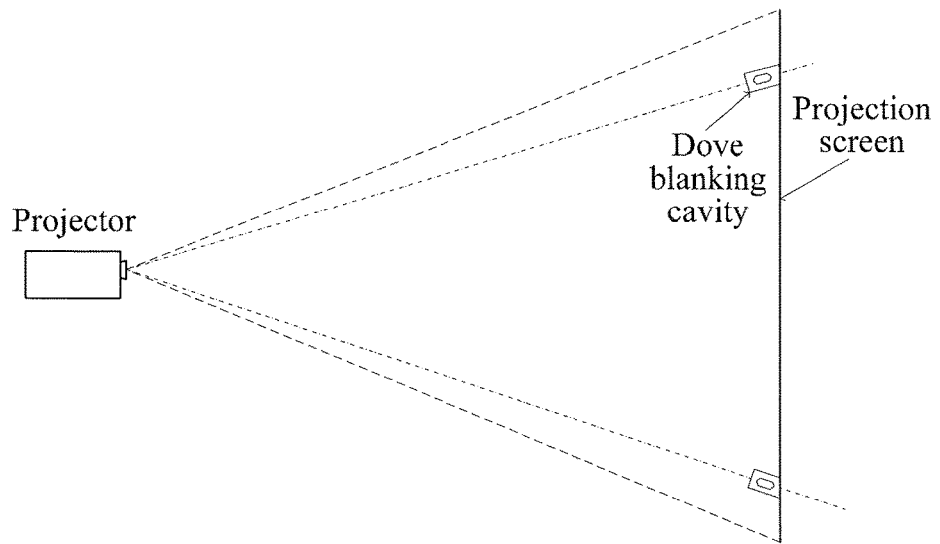
FIG. 20 is a schematic structural diagram of another projection system including multiple blanking optical modules.

Further, when the system needs multiple blanking areas, according to the foregoing principle, different optical modules may be designed according to a position at which each blanking area needs to be placed. FIG. 20 is a schematic structural diagram of a projection system including multiple blanking optical modules.

Figure 21:
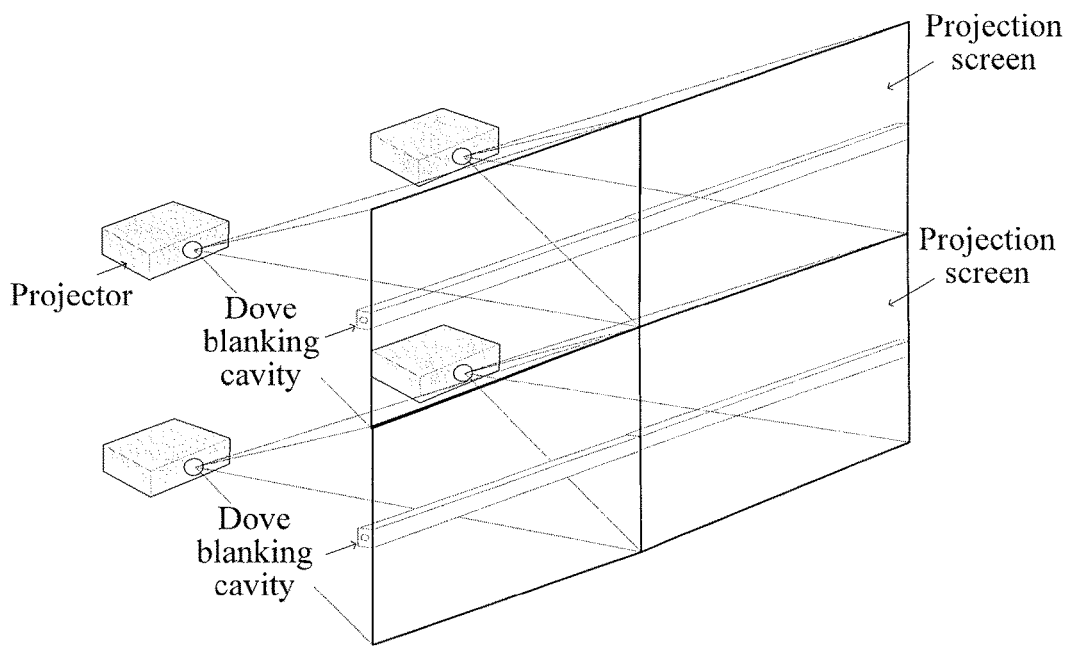
FIG. 21 is a schematic diagram of a projection matrix formed by projection systems including a single blanking optical module.

A projection matrix may be formed by using multiple projection system introduced above. FIG. 21 is a schematic diagram of a projection matrix formed by projection systems including a single blanking module.

According to the technical solution in the embodiments of the present invention, a non-transparent object may be integrated to a rear projection screen without casting a shadow. Therefore, a mechanical support structure may be used on the screen and an acquiring system may be integrated without affecting image quality. The solutions in the embodiments of the present invention are also applicable to another situation, for example, to a light emission display device.

Further, the system provided by the embodiments of the present invention has a very simple structure, and only two refractions and one reflection are needed. Because an image transmitted through a blanking area is rolled over in the blanking area, a digital image processing image processing method may be used to perform roll-over processing on this part of image to restore the image, which can retain image consistency in the entire system; and a compact and simple cavity structure can ensure simple and low-cost manufacturing.

In the several embodiments provided by this application, it should be understood that the disclosed system may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the protection scope of the technical solutions of the embodiments of the present invention.

What is claimed is:

1. An optical imaging processing system, comprising:
an incident light source;
a screen; and
at least one optical transmission medium, wherein the at least one optical transmission medium is disposed in an optical imaging path in which the incident light source is emergent and is projected to the screen;
wherein an light incident face of the at least one optical transmission medium faces the incident light source, and a light exiting face of the at least one optical transmission medium faces the screen,
wherein at least one cavity is comprised between the light incident face and the light exiting face of the at least one optical transmission medium, and a cross-section shape of the at least one cavity is an isosceles trapezoid or is a hexagon formed by two isosceles trapezoids,
wherein the at least one cavity comprises a light transmission area and a light blanking area used for object accommodation, and the optical imaging path bypasses the light blanking area and penetrates through the at least one optical transmission medium through the light transmission area,
wherein the screen comprises a rear projection screen, and the incident light source comprises a projector,
wherein an acquiring aperture corresponding to an acquiring view angle of an image acquiring device is provided at a front end of the rear projection screen, and
wherein an optical rod is disposed between the image acquiring device and the front end of the rear projection screen, and the optical rod is used for reducing, on the basis of retaining the acquiring view angle of the image acquiring device unchanged, a size of the acquiring aperture provided at the front end of the rear projection screen.

2. The system according to claim 1, wherein the at least one cavity comprises:
a first face used for incident light emitted by the incident light source to be incident;
a second face used for the incident light to reflect; and
a third face used for the incident light to be emergent,
wherein the first face and the third face form two waists of the isosceles trapezoid, respectively; and if an incident point of the incident light on the first face is a midpoint of one side waist of the isosceles trapezoid, then an emergent point of the incident light on the third face is a midpoint of the other side waist of the isosceles trapezoid.

3. The system according to claim 2, wherein a coating film used for increasing a reflection coefficient is attached to the second face.

4. The system according to claim 2, wherein an incident angle of the incident light on the first inclined face is less than an angle of total reflection.

5. The system according to claim 1, wherein a cross-section shape of the light blanking area is an isosceles triangle or is a quadrangle formed by two isosceles triangles.

6. The system according to claim 5, wherein the object accommodated in the light blanking area in the at least one cavity in the at least one optical transmission medium comprises at least one of a support rod of the screen and the image acquiring device.

7. An optical imaging processing system, comprising:
an incident light source;
a screen; and
at least one optical transmission medium, wherein the at least one optical transmission medium is disposed in an optical imaging path in which the incident light source is emergent and is projected to the screen;
wherein an light incident face of the at least one optical transmission medium faces the incident light source, and a light exiting face of the at least one optical transmission medium faces the screen,
wherein at least one cavity is comprised between the light incident face and the light exiting face of the at least one optical transmission medium, and a cross-section shape of the at least one cavity is an isosceles trapezoid or is a hexagon formed by two isosceles trapezoids,
wherein the at least one cavity comprises a light transmission area and a light blanking area used for object accommodation, and the optical imaging path bypasses the light blanking area and penetrates through the at least one optical transmission medium through the light transmission area, and
wherein the screen comprises a rear projection screen, wherein the incident light source comprises a projector, and wherein the projector comprises a processor and an emitter,
wherein the processor is used for: determining a target area and a roll-over shaft of an image, wherein the target area is an area in the image in which the incident light transmitted through the at least one cavity is projected, and the roll-over shaft is a straight line in the target area formed by the projection of the incident light passing through the midpoint of a waist of the isosceles trapezoid; and, performing roll-over processing on the target area along the roll-over shaft, to obtain an incident image after the roll-over processing; and
wherein the emitter is used for: emitting incident light, so as to project, by using the incident light, the image after the roll-over processing.

8. The system according to claim 7, wherein the at least one cavity comprises:
a first face used for incident light emitted by the incident light source to be incident;
a second face used for the incident light to reflect; and
a third face used for the incident light to be emergent,
wherein the first face and the third face form two waists of the isosceles trapezoid, respectively; and if an incident point of the incident light on the first face is a midpoint of one side waist of the isosceles trapezoid, then an emergent point of the incident light on the third face is a midpoint of the other side waist of the isosceles trapezoid.

9. The system according to claim 8, wherein a coating film used for increasing a reflection coefficient is attached to the second face.

10. The system according to claim 8, wherein an incident angle of the incident light on the first inclined face is less than an angle of total reflection.

11. The system according to claim 7, wherein a cross-section shape of the light blanking area is an isosceles triangle or is a quadrangle formed by two isosceles triangles.

12. The system according to claim 11, wherein the object accommodated in the light blanking area in the at least one cavity in the at least one optical transmission medium comprises at least one of a support rod of the screen and an image acquiring device.

* * * * *

UNITED STATES PATENT AND TRADEMARK OFFICE
CERTIFICATE OF CORRECTION

| | | |
|---|---|---|
| PATENT NO. | : 9,588,325 B2 | Page 1 of 1 |
| APPLICATION NO. | : 14/880880 | |
| DATED | : March 7, 2017 | |
| INVENTOR(S) | : Robertson et al. | |

It is certified that error appears in the above-identified patent and that said Letters Patent is hereby corrected as shown below:

On the Title Page

Item (72), second inventor name should read -- Kun Li --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*